United States Patent
Ishibashi et al.

[11] Patent Number: 5,905,525
[45] Date of Patent: May 18, 1999

[54] IMAGE DISPLAY APPARATUS HAVING A DISPLAY CONTROLLED BY USER'S HEAD MOVEMENT

[75] Inventors: Kenji Ishibashi, Izumi; Yasumasa Sugihara, Hashimoto; Yasushi Tanijiri, Sakai, all of Japan

[73] Assignee: Minolta Co., Ltd., Osaka, Japan

[21] Appl. No.: 08/678,315

[22] Filed: Jul. 11, 1996

[30] Foreign Application Priority Data

Jul. 13, 1995 [JP] Japan .................................. H7-177040
Jul. 25, 1995 [JP] Japan .................................. H7-188715

[51] Int. Cl.⁶ ....................................................... H04N 7/18
[52] U.S. Cl. .............................. 348/39; 348/61; 348/115; 345/8
[58] Field of Search ..................................... 348/121, 115, 348/113, 61, 39, 36; 345/9, 8, 7; H04N 7/18

[56] References Cited

U.S. PATENT DOCUMENTS 5,417,210  5/1995  Funda et al. ............................... 348/65
5,491,510  2/1996  Gove ........................................... 345/9

FOREIGN PATENT DOCUMENTS 1-277286  11/1989  Japan .
3-56923   3/1991   Japan .
3-189683  9/1991   Japan .
4-070899  3/1992   Japan .
5-281931  10/1993  Japan .
6-105339  4/1994   Japan .
8-220472  8/1996   Japan .

*Primary Examiner*—Bryan Tung
*Attorney, Agent, or Firm*—Burns, Doane, Swecker & Mathis, LLP

[57] ABSTRACT

An image taken by a mobile camera is displayed on a head-mounted display provided with an acceleration sensor to detect movement of the observer's head, and the size of the image viewed by the observer wearing the display is varied according to the movement of the observer's head. For varying the image size, the camera is equipped with a zoom lens to change the size of shooting area, or alternatively, the display is equipped with a zoom lens as the eyepiece to enlarge or reduce the size of the displayed image. An image showing the appearance of the camera is displayed being superimposed on the image taken by the camera in order to facilitate the control of the camera by the observer.

14 Claims, 13 Drawing Sheets

IMAGE DISPLAY APPARATUS HAVING A DISPLAY CONTROLLED BY USER'S HEAD MOVEMENT

BACKGROUND OF THE INVENTION

1. Field of the Invention

The present invention relates to image display apparatuses that change the size of an observed image in accordance with the movement of the head of the observer, and display an appearance image of an image shooting apparatus on an image shot by the image shooting apparatus.

2. Description of the Prior Art

Recent years have seen gradual spread of such display apparatuses that, by changing the displayed image in accordance with the view direction of the image observer, provide the observer with a sense of realism to such an extent that the observer feels as though he were put in the displayed image. For example, Japanese Laid-Open Patent No. H3-56923 discloses how, in a stereoscopy apparatus that displays images taken with a stereoscopic camera on a head-mounted display (hereinafter referred to as HMD), images are displayed in accordance with the direction of the observer's head by controlling the shooting direction of the stereoscopic camera to correspond to the direction of the HMD. Using a stereoscopic apparatus of this type, the observer can observe the image in a desired direction by simply changing the direction of his/her head.

However, in the stereoscopy apparatus described above, although the area of the image displayed on the HMD is changed in accordance with the shooting direction, the size of the displayed image cannot be changed as the user desires.

It is possible to make the shooting area variable on the stereoscopy apparatus described above by equipping it with a camera having a zoom lens. In that case, however, if the focal length of the zoom lens is controlled manually as in conventional cameras, the person wearing the HMD needs to be near the camera all the time. This greatly harms conveniences that the HMD offers in portability and operability.

On the other hand, a camera apparatus is known which is moved around by remote control in order to change the shooting position. An operator of such a camera apparatus controls movements of the camera while observing images taken by the camera. This type of camera is useful in shooting, for example, in places that are dangerous or inaccessible to human beings, because it can be controlled from a remote place to perform shooting.

However, with a conventional mobile camera apparatus, since it can only display images taken by the camera, the operator cannot correctly recognize the size of the camera itself, which often results in troubles in movement control. For example, in a situation where there is an obstacle ahead in the movement direction, it is difficult to judge to what extent the camera should be moved rightward or leftward in order to avoid the obstacle. Wrong judgement may cause the camera to collide with the obstacle with damage given to the camera. In a situation where there are obstacles on both sides of the path along which the camera will be driven, wrong recognition of the width of the path with respect to that of the camera may cause the camera to be trapped by the obstacles, making it impossible to move the camera forward nor backward.

If a mobile camera apparatus is provided with a function for making the shooting direction follow the direction of the observer's head, it is possible to shoot in any direction irrespective of the movement direction of the camera, enhancing its utility greatly. In this case, however, the image taken and displayed does not correspond to the movement direction of the camera, making the movement control operation more difficult.

SUMMARY OF THE INVENTION

An object of the present invention is to provide an image display apparatus capable of setting the size of an observed image in accordance with the movement of the observer's head. Another object of the present invention is to provide an image display apparatus provided with an image shooting apparatus with which the operator can correctly recognize the size and the movement direction of the image shooting apparatus.

To achieve the first object, an image display apparatus of the present invention is provided with a display means for displaying an image, a detection means for detecting movement of an image observer's head, and a control means for changing display magnification of the image displayed on the display means in accordance with the movement of the image observer's head detected by the detection means.

The display means is typically an HMD, which is provided with an acceleration sensor as the detection means. A detected acceleration is integrated to a velocity, which in turn is integrated to a distance representative of the amount of movement of the head of the observer wearing the HMD. The obtained distance is used by the control means to change the display magnification.

Two methods are employed for changing the display magnification. In the first method, a camera having a zoom lens as the taking lens is used to change the size of shooting area. In the second method, an HMD having a zoom lens as the eyepiece is used to change the image size viewed therethrough by the observer.

To achieve the second object, an image display apparatus is provided with an shooting apparatus for shooting an image, an appearance image generating means for generating an appearance image showing an external appearance of the shooting apparatus, and a display means for displaying the image shot by the shooting apparatus, superimposing thereon the appearance image generated by the appearance image generating means.

The image shooting means is typically a mobile stereoscopic camera capable of changing the size of shooting area as well as the direction of shooting. The image generating means changes the size and the position of the external appearance of the camera according to the size of shooting area and to the shooting direction. The external appearance of the camera is displayed on the image shot by the camera to facilitate the operation of the camera.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
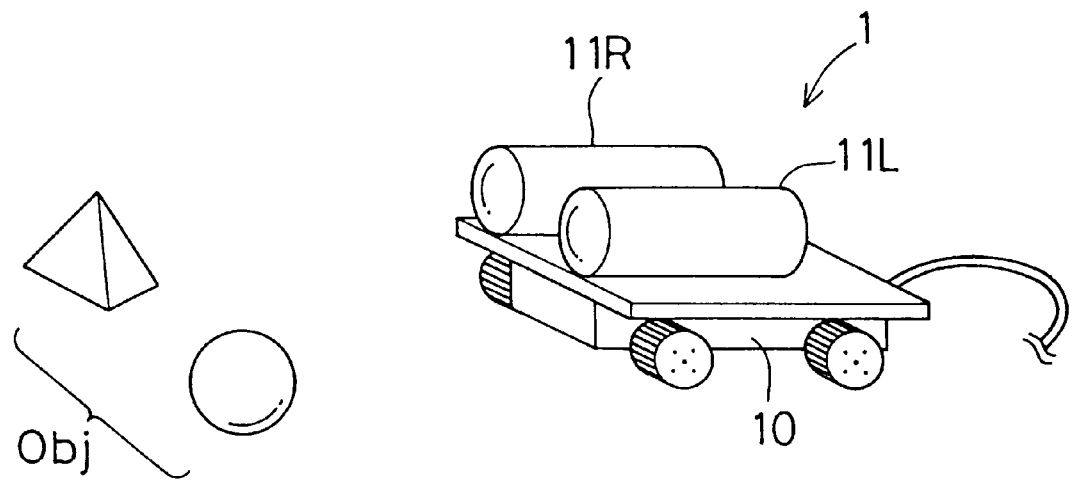
FIG. 1 is an external view showing an outlined constitution of an image display apparatus of a first embodiment of the present invention.
Figure 1:
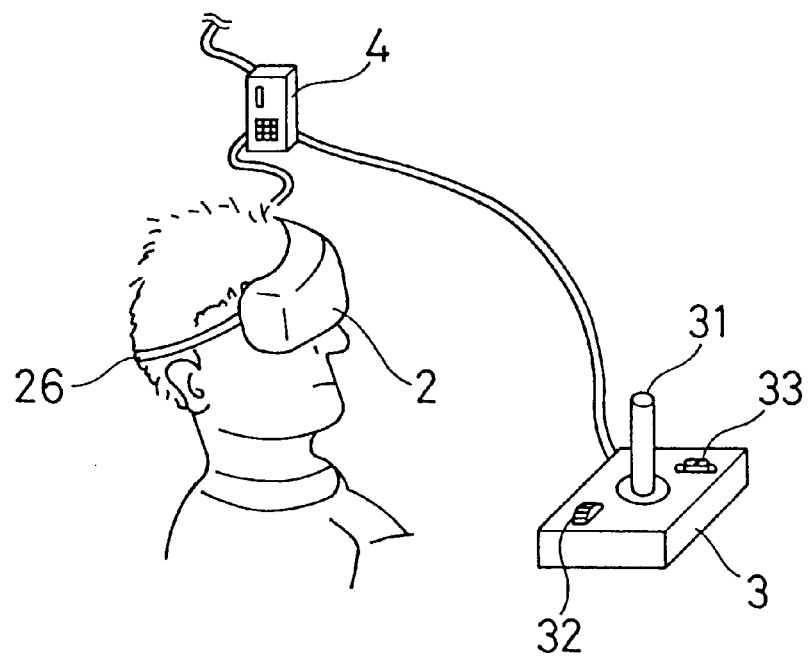

With reference to the drawings, the image display apparatus of the present invention will be described below. FIG. 1 shows an outlined constitution of a first embodiment of the present invention. The image display apparatus is composed of a stereoscopic camera 1, an HMD 2, an operation board 3, and a control box 4.

The stereoscopic camera 1 comprises a vehicle 10 with wheels, and right and left cameras 11R and 11L fixed thereon, and is capable of freely moving forward or backward and turning rightward or leftward. By shooting an object Obj with the right and left cameras 11R and 11L, right and left images are generated, with a parallax between them. The right and left cameras 11R and 11L each is equipped with a zoom lens serving as a taking lens, so that the shooting area can be changed by controlling the focal length of the zoom lens.

The HMD 2 presents the right and left images taken by the stereoscopic camera 1 before the eyes of an observer that wears the HMD 2, providing the observer with a stereoscopic image of the object Obj. The operation board 3 has an operation lever 31, an operation dial 32, and a switch 33, all of which are manually operated by the observer. The control box 4 is connected to the stereoscopic camera 1, the HMD 2 and the operation board 3 so as to transmit image signals from the stereoscopic camera 1 to the HMD 2, and to control the stereoscopic camera 1 according to signals received from the HMD 2 and the operation board 3.

Figure 2:
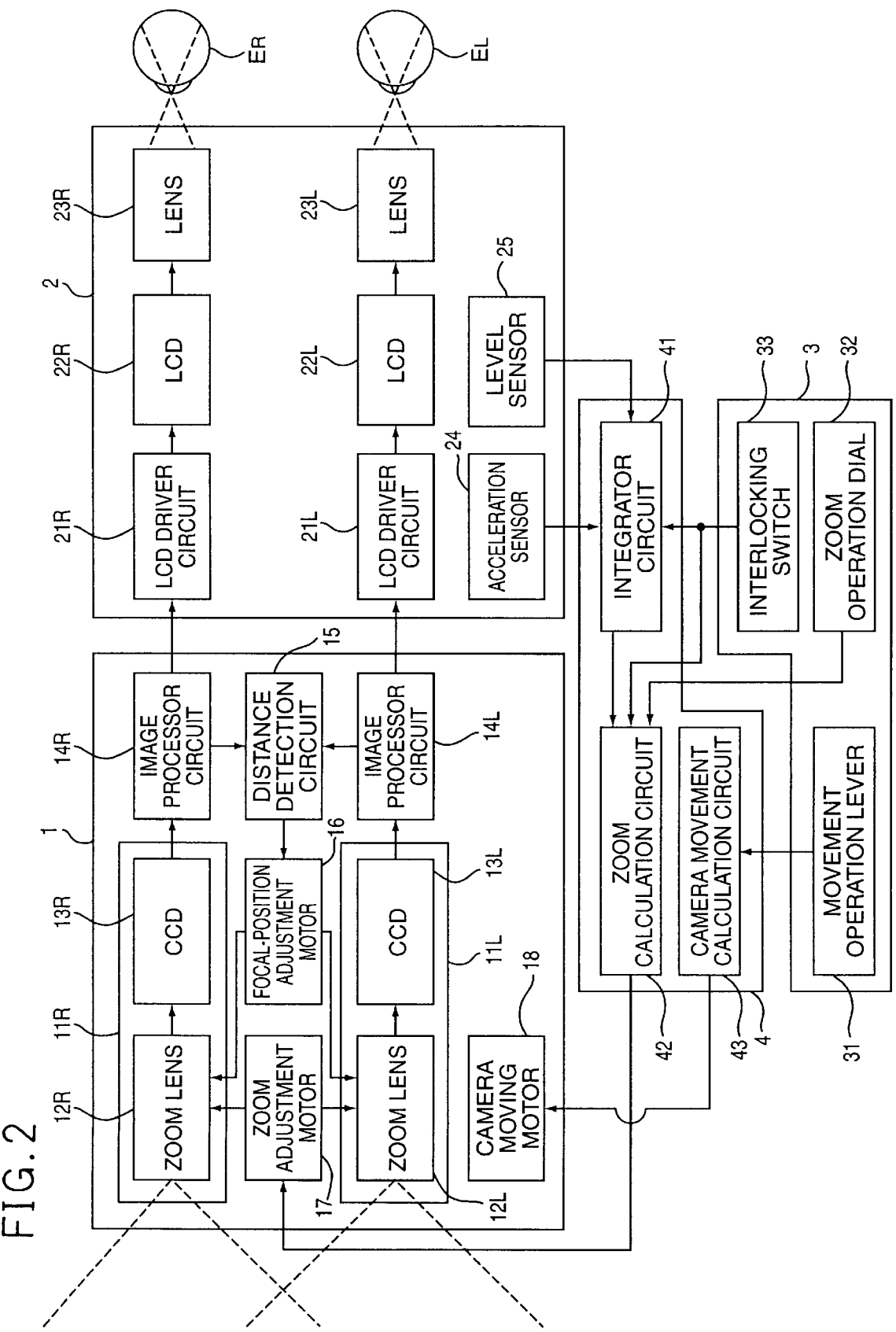
FIG. 2 is a block diagram showing the constitution of the image display apparatus of the first embodiment of the present invention.

FIG. 2 shows the constitution of each unit and signal flows. The right and left cameras 11R and 11L of the stereoscopic camera 1 have charge-coupled devices (CCDs) 13R and 13L, respectively, serving as image pickup devices, so that shooting is effected by receiving on the CCDs 13R and 13L the light incoming from the object through the zoom lenses 12R and 12L. The stereoscopic camera 1 is further provided with right and left image processor circuits 14R and 14L, a distance detection circuit 15, a focal-position adjustment motor 16 for adjusting the focal position of the zoom lenses 12R and 12L, a zoom adjustment motor 17 for adjusting the focal length of the zoom lenses 12R and 12L, and a camera moving motor 18 for driving the vehicle.

The CCDs 13R and 13L convert the received light into electric signals, and supplies the signals to the right and left image processor circuits 14R and 14L. The right and left image processor circuits 14R and 14L convert the signals from the CCDs 13R and 13L into video signals to be delivered to the HMD 2, and, meanwhile, supplies signals representing a predetermined portion of CCDs 13R and 13L to the distance detection circuit 15. The distance detection circuit 15, based on the thus given right and left signals, detects the positions of the right and left images of the object, and then, based on the positional deviation between the right and left images, detects the deviation of the focal position and the distance to the object. Based on the detected focal-position deviation, the distance detection circuit 15 drives the focal-position adjustment motor 16 to adjust the focal positions of the zoom lenses 12R and 12L, so that the light from the object forms images on the photoreceptive surfaces of the CCDs 13R and 13L.

The zoom adjustment motor 17 is driven based on a control signal from the control box 4 to adjust the focal lengths of the zoom lenses 12R and 12L. The camera moving motor 18 is driven based on a control signal from the control box 4 to rotate the wheels so as to make the stereoscopic camera 1 move forward or backward, or turn rightward or leftward.

The HMD 2 comprises right and left liquid crystal displays (LCDs) 22R and 22L, right and left LCD driver circuits 21R and 21L for driving the LCDs, right and left eyepieces 23R and 23L, an acceleration sensor 24, and a level sensor 25. The HMD 2 is also equipped with an attachment member 26 (FIG. 1) for mounting the HMD on the observer's head. The right and left video signals from the image processor circuits 14R and 14L of the stereoscopic camera 1 are fed to the right and left LCD driver circuits 21R and 21L, respectively. The LCD driver circuits 21R and 21L display the images carried on the received signals on the LCDs 22R and 22L, respectively.

The eyepieces 23R and 23L direct the image light of the LCDs 22R and 22L to the right and left eyes EL and ER of the observer. The eyepieces 23R and 23L have a fixed focal length, which is set to a value that makes the images on the LCDs 22R and 22L appear enlarged. By observing images through the eyepieces 23R and 23L, the observer observes the virtual images of the images displayed on the LCDs 22R and 22L. The optical axes of the right and left eyepieces 23R and 23L are parallel to each other.

The acceleration sensor 24 detects acceleration resulting from the forward or backward movement of the head of the observer wearing the HMD 2. Used as the acceleration sensor 24 is a piezoresistance-type acceleration sensor, which comprises a piezoresistor that changes its electric resistance when subjected to strain, and a plumb for applying strain to the piezoresistor when subjected to a force. The piezoresistance-type acceleration sensor outputs a voltage proportional to an acceleration that the sensor receives. By means of this sensor, it is possible to detect the magnitude and the direction of an acceleration.

The acceleration sensor 24 is disposed in such a way that it detects acceleration in the direction along the optical axes of the eyepieces 23R and 23L. Suppose here that a direction from the observer's eyes EL and ER to the eyepieces 23R and 23L is positive, and that a direction reverse thereto is negative. The acceleration sensor 24 generates a positive voltage when subjected to a positive acceleration, and generates a negative voltage when subjected to a negative acceleration.

Accordingly, when the observer, wearing the HMD 2 and facing forward, starts moving the head forward, a positive voltage is outputted, and, when the observer starts moving the head backward, a negative voltage is outputted. In addition, when acceleration or deceleration appears during a forward movement, a positive or negative voltage, respectively, is outputted. Reversely, for acceleration or deceleration during a backward movement, a negative or positive voltage, respectively, is outputted.

Figure 6:
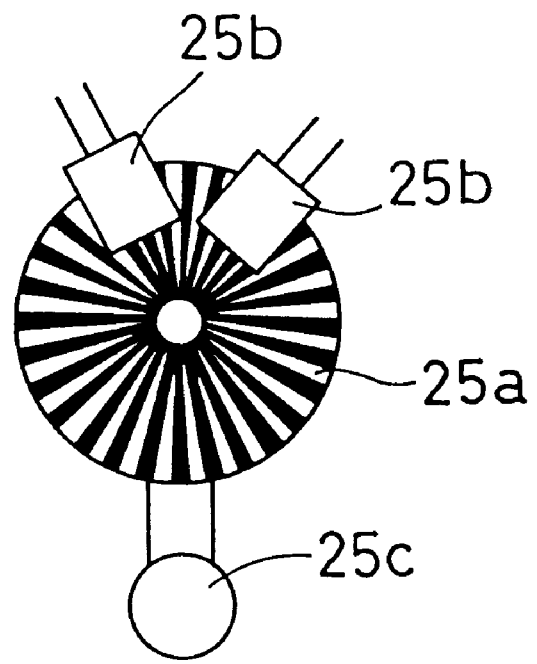
FIG. 6 shows the constitution of the level sensor of the image display apparatus of the present invention.

The level sensor 25 detects the tilt of the HMD 2 in the forward/backward direction, and outputs a signal representing the direction and degree of the tilt. As shown in FIG. 6, the level sensor 25 comprises an encoder plate 25a with a black-and-white radial pattern printed on its surface and having a weight 25c in its lower part, and two photoreflectors 25b each of which has a light emitting device and a light receiving device. The white sectors of the encoder plate 25a reflect light, whereas the black sectors absorb light. The photoreflector 25b emits light toward the encoder plate 25a to detect the reflected light, and outputs a H-level or L-level voltage depending on whether reflected light is detected or not.

The photoreflectors 25b are fixed to the HMD 2, and the encoder plate 25a is attached to the HMD 2 to be freely rotatable around the center of the black-and-white pattern. Its rotation axis is set to be vertical to the optical axes of the eyepieces 23R and 23L. When the HMD 2 is inclined forward or backward, the photoreflectors 25b incline together with the HMD 2, whereas the encoder plate 25a is kept in a fixed direction with respect to the direction of gravity owing to the weight 25c. As a result, the photoreflectors 25b rotate with respect to the encoder plate 25a, making the light detected by the light receiving device intermittent, and thus making the output voltage of the photoreflectors 25b a pulse wave. The degree of tilt of the HMD 2 is detected based on the number of those pulses. The two photoreflectors 25b are arranged with respect to the encoder plate 25a in such a way that their output pulse phases differ by one-forth from each other. Thus, the direction of tilt of the HMD 2 is detected based on the phase difference.

The control box 4 incorporates a integrator circuit 41, a zoom calculation circuit 42, and a camera movement calculation circuit 43. The integrator circuit 41 is fed with the output voltage of the acceleration sensor 24 and the output voltage of the level sensor 25. The integrator circuit 41 detects the forward/backward tilt of the HMD 2 based on the output of the level sensor 25, and corrects the output of the acceleration sensor 24 based on the detected tilt to find a horizontal acceleration component. As a result, forward/backward acceleration of the observer's head is obtained irrespective of the upward/downward direction of the head of the observer wearing the HMD 2.

The integrator circuit 41 integrates the thus obtained forward/backward acceleration in two steps. First, the acceleration is integrated in order to obtain a velocity. Then, the velocity is further integrated in order to obtain a movement distance D. Suppose the forward/backward position of the observer's head at the time of starting acceleration detection is P0, and the position of the observer's head at the time of detecting acceleration is P, then the movement distance D is P-P0. When the observer's head is farther forward than its position at the time of starting acceleration detection, D is a positive value; when the observer's head is farther backward than its position at the time of starting acceleration detection, D is a negative value. The integrator circuit 41 supplies a signal representing the movement distance D to the zoom calculation circuit 42.

The zoom calculation circuit 42 determines the size of the shooting area based on the signals from the integrator circuit 41 and from the operation dial 32 of the operation board 3 in order to calculate, in accordance with that shooting area, the focal lengths to which the zoom lenses 12R and 12L should be set, and then supplies a control signal to the zoom adjustment motor 17 of the stereoscopic camera 1. When the zoom calculation circuit 42 determines the shooting area based on the output from the integrator circuit 41, the size of the shooting area changes in accordance with the forward/backward movement of the head of the observer wearing the HMD 2. As to the method of determining the size of the shooting area, a detailed description will be given later.

The camera movement calculation circuit 43, receiving a signal from the operation lever 31, generates a control signal for moving the stereoscopic camera 1 forward or backward, or turning its movement direction. This control signal is fed to the camera moving motor 18.

The operation lever 31 of the operation board 3 is used to control the movement of the stereoscopic camera 1. By inclining the movement operation lever 31 forward, backward, leftward or rightward, the observer can remote-control the stereoscopic camera 1 to shoot in desired directions.

The operation dial 32 is used to change the shooting area. As described above, the output of the zoom operation dial 32 is fed to the zoom calculation circuit 42. By rotating this zoom operation dial 32, the observer can manually set the shooting area to a desired size.

The switch 33 is used to specify whether or not the shooting area and the forward/backward position of the observer's head are interlocked. When this switch is set in ON, the integrator circuit 41 integrates the acceleration to supply a signal representing the movement distance D to the zoom calculation circuit 42.

In the image display apparatus having the above described constitution, the shooting area can be set not only in accordance with the forward/backward position of the observer's head but also by manual operation. Since the whole of an image taken by the stereoscopic camera 1 is displayed on the LCDs 22R and 22L of the HMD 2, changing the shooting area is equivalent to changing the size of the image observed by the observer.

Figure 7A:
FIGS. 7A to 7C show the forward and backward movement of the upper part of the observer's body.
Figure 7B:
Figure 7C:
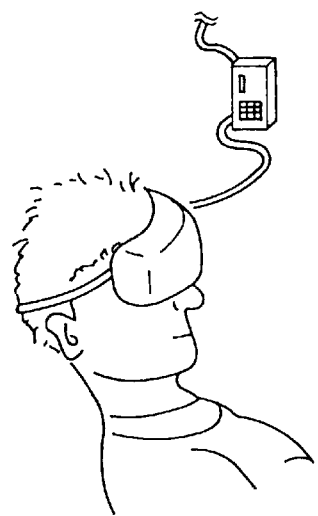
Figure 8A:
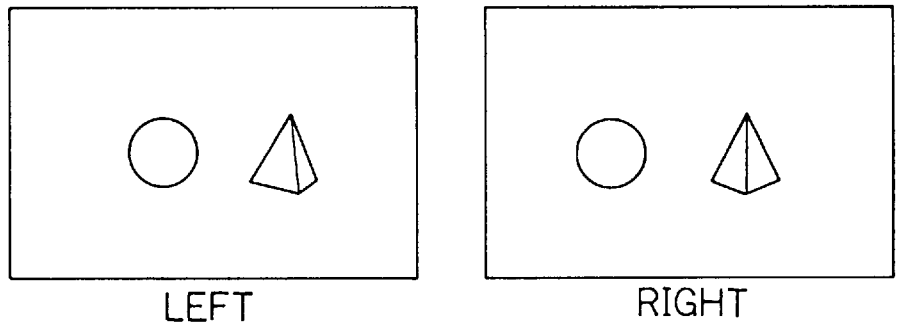
FIGS. 8A to 8C show examples of changes in the size of the observed image in the image display apparatus of the present invention.
Figure 8B:
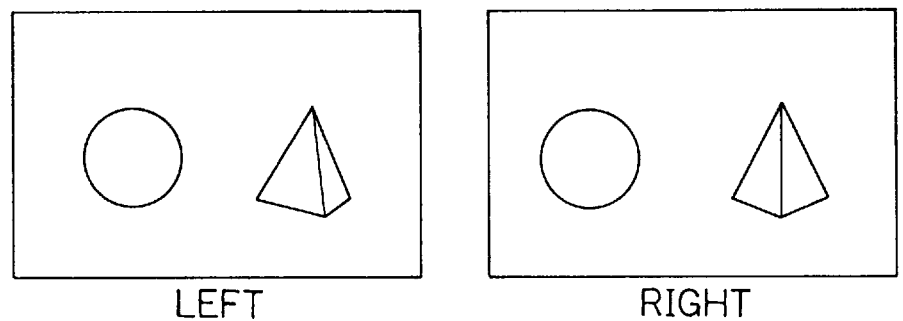
Figure 8C:
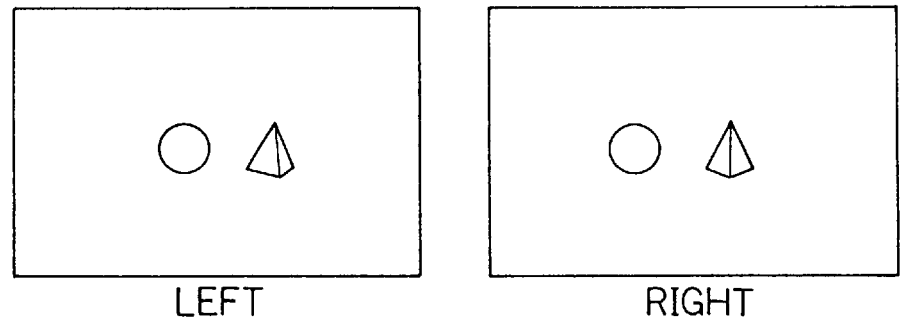

FIGS. 7A to 7C show examples of the change in the forward/backward position of the observer's head. Here, the observer is assumed to be in a fixed position, as sitting on a chair. FIG. 7A shows a normal state where the observer faces forward keeping the upper part of the body upright, FIG. 7B shows the state where the observer is leaning forward with the head moved forward, and FIG. 7C shows the state where the observer is leaning backward with the head moved backward as compared with FIG. 7A. Examples of images displayed on the HMD 2 corresponding to the states shown in FIGS. 7A to 7C of the HMD 2 are shown in FIGS. 8A to 8C. When the observer's head is forward, the object image is enlarged since it is taken with a reduced shooting area; when the observer's head is backward, the object image is reduced since it is taken with a enlarged shooting area. Also, where the observer does not stay in a fixed position, that is, where the observer moves forward or backward, the position of the observer's head is detected from the acceleration, and the size of the shooting area is changed in the same way.

The present invention uses the following two methods in setting the size of the shooting area. According to the first methods, when the observer's head is in a predetermined range, the size of the shooting area is not changed; when the observer's head is in front of the predetermined range, the shooting area is made smaller and smaller at a predetermined rate; when the observer's head is behind the predetermined range, the shooting area is made larger and larger at a predetermined rate. This method of setting the shooting area based on the position of the observer's head admits manual adjustment by means of the zoom operation dial 32.

Figure 4:
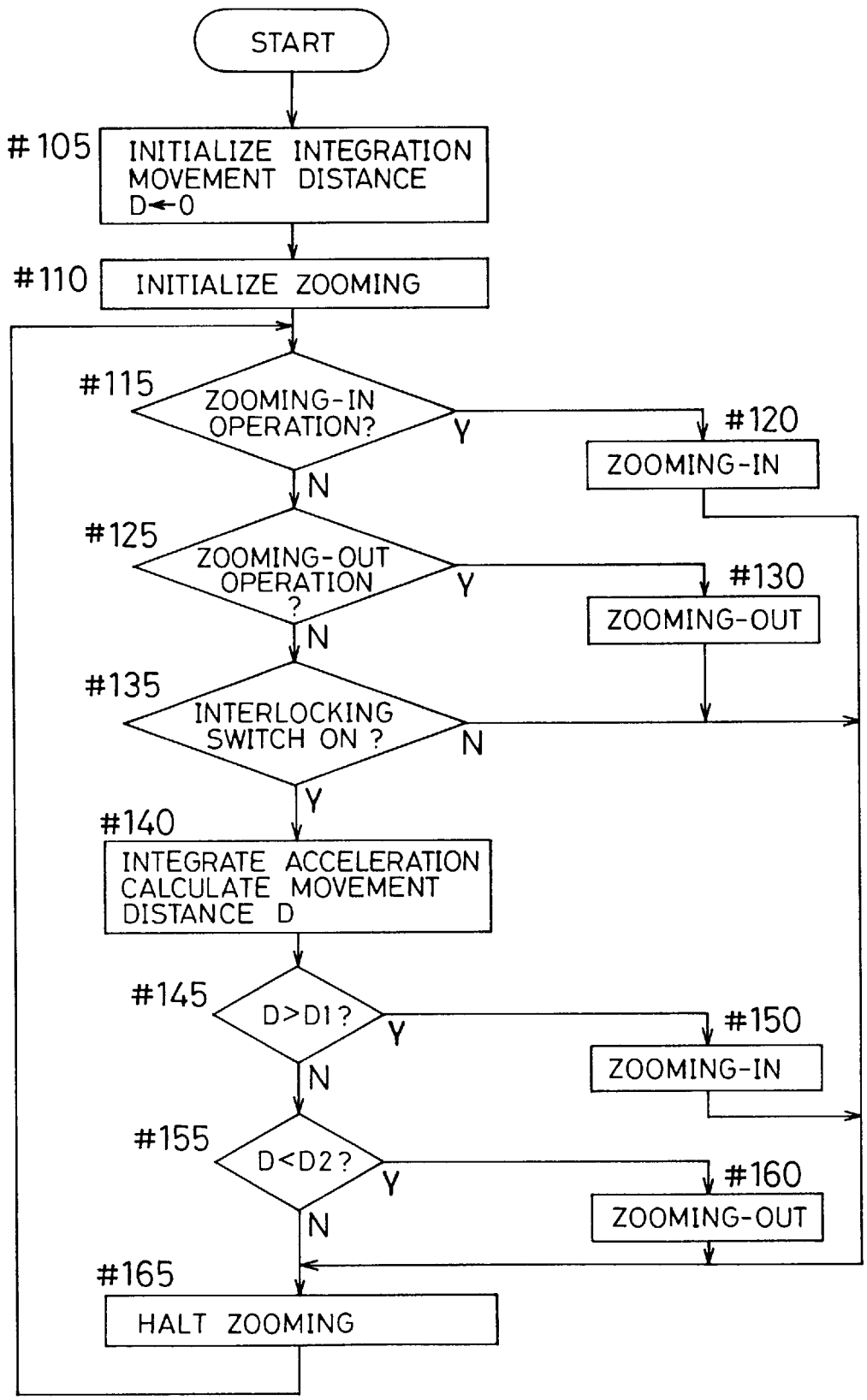
FIG. 4 is a flow chart showing the first method of controlling the size of the observed image in the image display apparatus of the present invention.

FIG. 4 is a flow chart showing the flow of control processes according to this method. Just after the start of control, an initialization process takes place. In this process, the integrator circuit 41 is initialized so that the first-time integration value, i.e. the movement velocity of the observer's head, and the second-time integration value, i.e. the movement distance D of the observer's head are both set to zero (step #105). During this process, the observer is required to keep his/her head at rest so as not to produce acceleration. Further, the focal length of the zoom lenses 12R and 12L of the stereoscopic camera 1 is set to a predetermined value in order to set the shooting area to a standard size (#110).

After the initialization process, a process cycle from step #115 to #165 is repeated. The cycle time of one cycle is set to 50 msec. First, it is judged whether the zoom operation dial 32 of the operation board 3 is operated or not (#115, #125). When the operation dial 32 is rotated in the direction for zooming-in, the focal length of the zoom lenses 12R and 12L is made longer to achieve zooming-in (#120); when the operation dial 32 is rotated in the direction for zooming-out, the focal length is made shorter to achieve zooming-out (#130). The rate at which the size of the shooting area is changed is set proportional to how much the operation dial 32 is rotated.

When the zoom operation dial 32 is not operated at all, the setting of the interlocking switch 33 is judged (#135). When the interlocking switch 33 is OFF, processing proceeds to #165; when the interlocking switch 33 is ON, the integrator circuit 41 integrates the horizontal forward/backward acceleration to detect the forward/backward movement distance D of the observer's head (#140). Then, the detected movement distance D is compared with a predetermined positive value D1 (#145). When the movement distance D is larger than D1, the focal length of the zoom lenses 12R and 12L is made longer to achieve zooming-in (#150); when the movement distance D is equal to or smaller than D1, the movement distance is compared with a predetermined negative value D2 (#155). When the movement distance D is smaller than D2, the focal length is made shorter to achieve zooming-out (#160). When D is equal to or larger than D2, zoom operation is not performed (#165).

In this embodiment, D1 is set to +15 cm and D2 is set to −15 cm. Therefore, after the start of control, when the observer's head moves more than 15 cm forward, zooming-in is performed; when the observer's head moves more than 15 cm backward, zooming-out is performed. When the movement distance of the observer's head is within ±15 cm, zooming is not performed but the size of the shooting area at that time point is maintained.

In steps #150 and #160, adjustment of the focal length of the zoom lenses 12R and 12L is performed in such a way that the size of the shooting area is changed at a fixed rate. More specifically, enlargement or reduction of a displayed image is set to be performed at a rate of 7% per second. Accordingly, a displayed image is enlarged by a factor of 2 or reduced by a factor of ½ in about 10 seconds.

The zoom process in steps #120, #130, #150, and #160 are each performed for a predetermined period and then halted in step #165. When the zoom operation dial 32 is operated continuously, or when, with the interlocking switch 33 ON, the operator's head is more than 15 cm forward or backward, the shooting area changes continuously, since the cycle from #115 to #165 is repeated. In addition, when the zoom operation dial 32 is operated, steps #140 to #160 are not performed but manually-operated setting of the shooting area is given priority over setting of the same in accordance with the position of the observer's head.

According to this method, the observer, while staying in a fixed position, can change the observed image to a desired size by simply moving the upper part of his/her body forward or backward. When the observer sets the upper part of his/her body upright again, the size of the image is kept as it is. Consequently, setting of the size of the observed image can be realized with the very natural motions of the observer. Also, by moving one-step forward or backward, the observer can start enlargement or reduction of the observed image; by moving backward or forward back to the original position, the observer can observe the image in a desired size. Incidentally, the values of D1, D2, and the rate at which the image size is changed when the position of the observer's head exceeds D1 or D2 are not necessarily confined to the specific values given above, but may be set to other values so that the HMD 2 can be used most conveniently.

Figure 5:
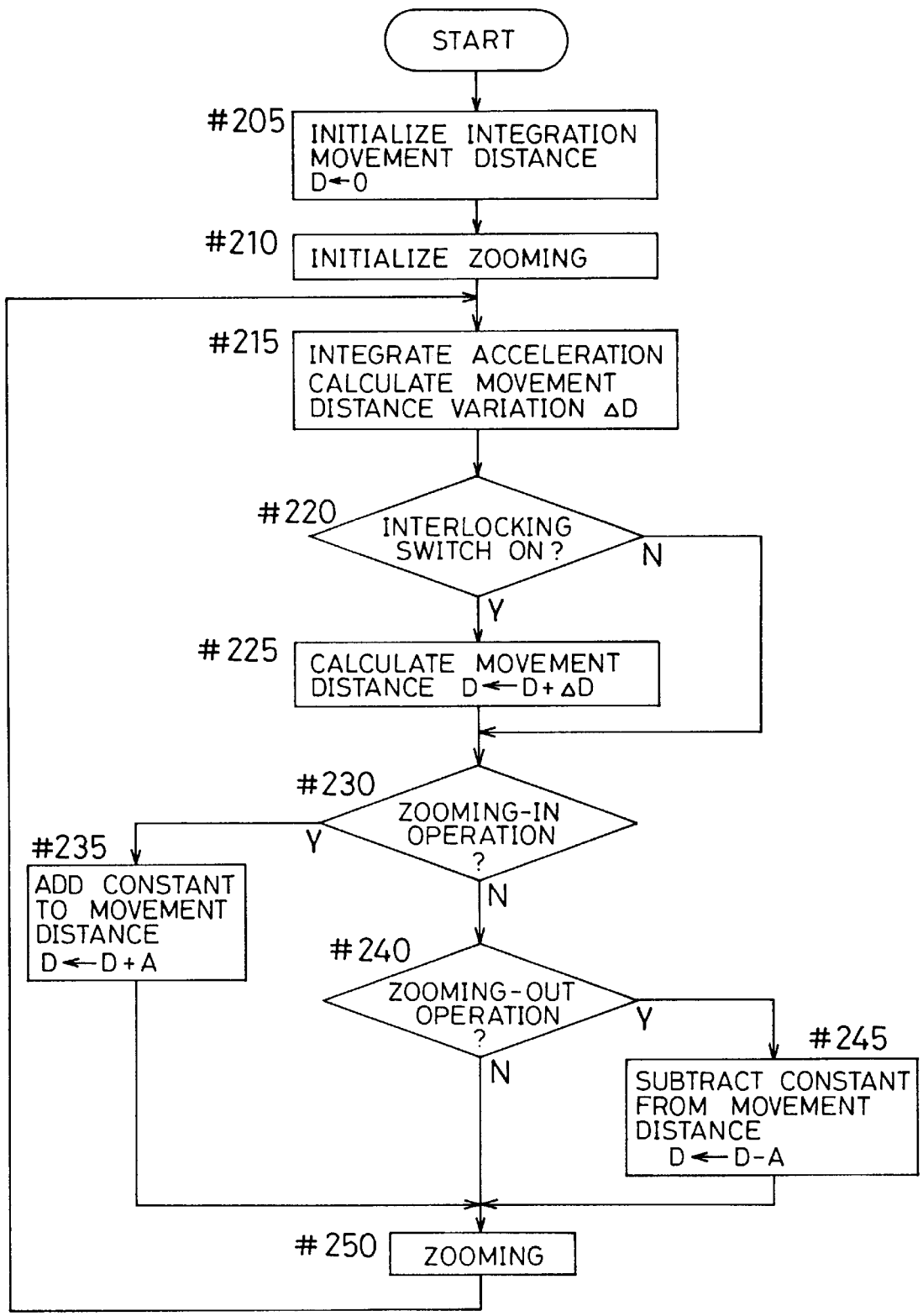
FIG. 5 is a flow chart showing the second method of controlling the size of the observed image in the image display apparatus of the present invention.

The second method of setting the size of the shooting area will be described below. In this method, the size of the shooting area is made to correspond one to one to the movement distance D of the observer's head. FIG. 5 is a flow chart showing the process flow of this method.

Just after the start of control, an initialization process takes place. In this process, the integrator circuit 41 is initialized so that the first-time integration value, i.e. the movement velocity of the observer's head, and the second-time integration value, i.e. the movement distance D of the observer's head are both set to zero (step #205). During this process, the observer is required to keep his/her head at rest so as not to produce acceleration. Further, the focal length of the zoom lenses 12R and 12L of the stereoscopic camera 1 is set to a predetermined value in order to set the shooting area to a standard size (#210).

After the initialization process, a process cycle from step #215 to #250 is repeated. The cycle time of one cycle is set to 50 msec. First, the integrator circuit 41 integrates the horizontal forward/backward acceleration to detect a variation ΔD in the movement distance of the head after the previous cycle (#215). Next, the setting of the interlocking switch 33 of the operation board 3 is judged (#220). When the interlocking switch 33 is ON, the variation ΔD is added to the movement distance D of the previous cycle to update the movement distance D of the observer's head (#225). When the interlocking switch 33 is OFF, the movement distance D is not updated.

Next, it is judged whether the zoom operation dial 32 is operated or not (#230, #240). When the zoom operation dial 32 is rotated in the direction for zooming-in, a predetermined positive value A is added to the movement distance D (#235). In contrast, when the zoom operation dial 32 is rotated in the direction for zooming-out, the predetermined positive value A is subtracted from the movement distance D (#245). When the dial 32 is not rotated at all, the movement distance D is left untouched.

Thereafter, a zoom process is performed by adjusting the focal length of the zoom lenses 12R and 12L (#250). The zoom process is controlled by the zoom calculation circuit 42. Here, the zoom calculation circuit 42 makes the focal length of the zoom lenses 12R and 12L to correspond one to one to the movement distance D in a way that the shooting area becomes smaller as the movement distance D becomes larger, and reversely the shooting area becomes larger as the movement distance D becomes smaller. When the movement distance D is the same as that of the previous cycle, the focal length is not updated, and accordingly the size of the shooting area is not changed. The value that the focal length takes when the movement distance D is zero is the predetermined value used in the initialization process at step #210.

The relationship between the focal length and the movement distance D can be set, for example, in a way that the size of the shooting area is a linear function of the movement distance D, or in a way that the focal length is a linear function of the movement distance D. Alternatively, any other function can be introduced as long as the size of the shooting area increases monotonically as the movement distance D becomes larger.

When the size of the shooting area is set according to the second method, the observer can observe the image in the size corresponding to the forward/backward movement distance of the observer's head. While the observer stays in a fixed position, the observer can continuously observe the image in a desired size by moving the upper part of his/her body forward or backward and then keeping that posture. Also, by moving a certain distance forward or backward and then staying in that position, the observer can continuously observe the image in a desired size. In addition, the size of the observed image can be manually adjusted by operating the zoom operation dial 32.

In the above described control processes according to the first and second methods, the zoom calculation circuit 42 is so configured that it adjusts the focal length only within the permissible range of focal length of the zoom lenses 12R and 12L. Owing to this configuration, the stereoscopic camera 1 is in no case damaged, whatever value the movement distance D of the observer's head may take. The operation board 3 is equipped with a switch, which is not shown in the figure, for selecting between the first and second control methods.

Although a piezoresistance-type acceleration sensor is used as the acceleration sensor 24 in this embodiment, it is also possible to use a magnetic sensor that makes use of the fact that, when orthogonally-arranged coils are moved in a magnetic field, the current flowing through the coils varies. In that case, however, the use of the HMD 2 is confined to places that satisfy certain conditions.

Figure 3:
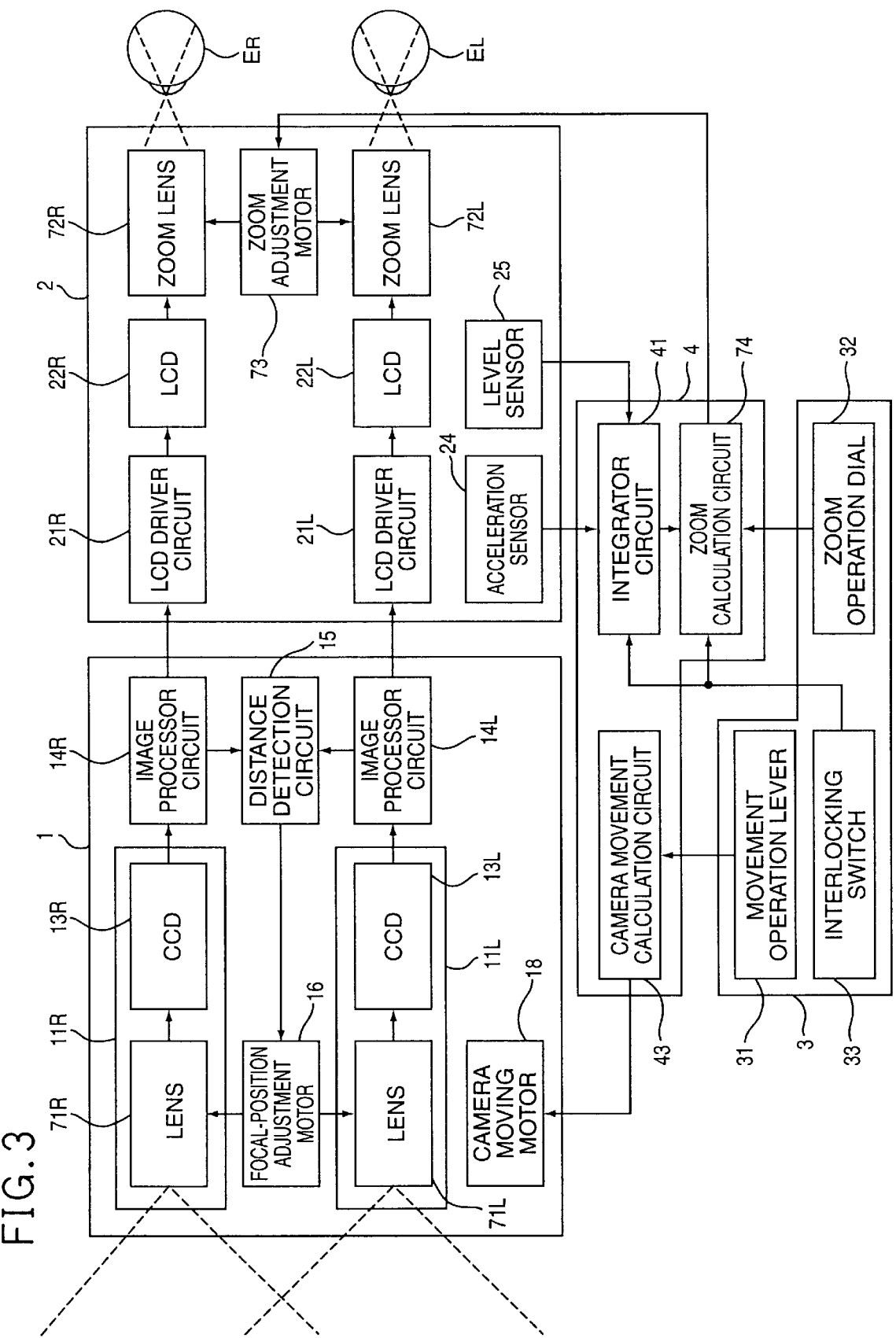
FIG. 3 is a block diagram showing the constitution of the image display apparatus of a second embodiment of the present invention.

FIG. 3 shows the constitution of an image display apparatus of a second embodiment. In this embodiment, the stereoscopic camera 1 is provided with fixed-focal-length lenses 71R and 71L that serve as taking lenses, and the HMD 2 is provided with zoom lenses 72R and 72L that serve as eyepieces. As a result of this constitution, the HMD 2 is equipped with a zoom adjustment motor 73, through which a zoom calculation circuit 74 of the control box 4 adjusts the focal length of the zoom lenses 72R and 72L. Since the other portions are constructed in the same way as in the first embodiment, no description will be given as to similarly constructed portions.

In the image display apparatus of this constitution, the size of the shooting area of the stereoscopic camera 1 is fixed, and accordingly the size of the image displayed on the HMD 2 is fixed. However, by changing the focal length of the eyepieces, the size of the image provided to the observer's eyes can be changed. The zoom lenses 72R and 72L are so configured that, when their focal length is shortest, the whole area of the display panels of the LCDs 22R and 22L is observed, and that, as the focal length is set longer, a central area of the display panels of the LCDs 22R and 22L is observed with more enlargement.

Also in this embodiment, the movement distance D of the observer's head is detected by detecting the acceleration by means of the acceleration sensor 24 of the HMD 2 and then integrating the acceleration by means of the integrator circuit 41. The zoom calculation circuit 74 adjusts the focal length of the zoom lenses 72R and 72L in accordance with the movement distance D. The control of focal-length adjustment is processed according to the first or second methods mentioned in the description of the first embodiment. Specifically, according to one method, the size of the observed image is not changed when the forward/backward position of the observer's head is within a predetermined range, whereas it is enlarged or reduced at a predetermined rate when the observer's head is farther forward or backward than the predetermined range. According to the other method, the size of the observed image is made to correspond one to one to the movement distance D of the observer's head.

Hereinbefore, the present invention has been described with two embodiments. However, the application of the image display apparatus of the present invention is not confined to a constitution where a camera and an HMD is combined. For example, instead of the stereoscopic camera 1 of the first embodiment, a computer can be used for generating right and left images. In that case, the size of the images generated by the computer is controlled based on the output of the zoom calculation circuit 42. Further, it is also possible, by recording images generated by the computer and displaying the recorded images on the HMD 2 of the second embodiment, to display the images in a desired size when they are displayed.

Figure 9A:
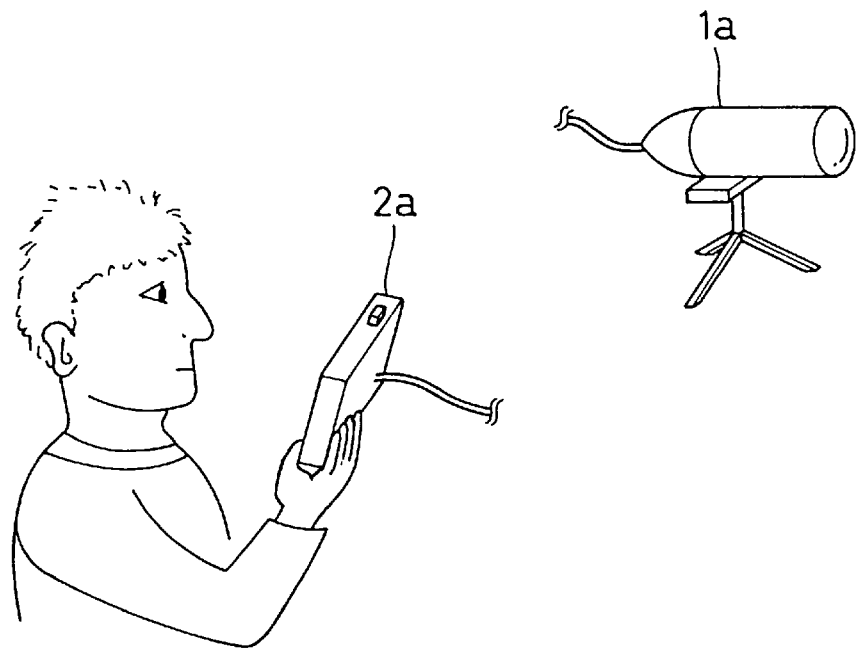
FIGS. 9A and 9B show other constitution of the image display apparatus of the present invention.

As shown in FIG. 9A, the present invention can be applied to a constitution where an image taken by a camera 1a is observed on a hand-held display device 1a. In this case, the camera 1a has a zoom lens as a taking lens, and the display device 2a is equipped with an acceleration sensor and a level sensor, for example. The acceleration sensor detects the forward/backward movement of the observer or the bend of the observer's elbow, and the focal length of the camera is adjusted in accordance with the forward/backward movement of the display device 2a.

Figure 9B:
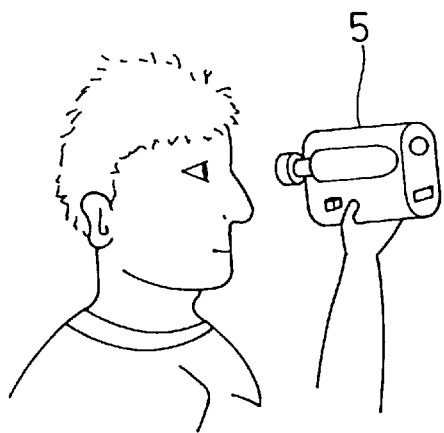

Moreover, as shown in FIG. 9B, the present invention can be applied to a hand-held video camera 5. The video camera is provided with a zoom lens for shooting, an acceleration sensor, a level sensor, an image recording medium, and a display device for monitoring, and is so designed that the size of the shooting area is changed in accordance with the forward/backward movement of its user. In this case, the size of the image displayed on the display device changes in accordance with that of the recorded image.

Since the display device 2a of FIG. 9A or the video camera 5 of FIG. 9B are held by hand, they are subject to forward/backward tilt. According to the present invention, the degree and direction of the tilt is detected by the level sensor. As a result, the horizontal forward/backward acceleration can be determined by removing a gravitational-acceleration component from the acceleration detected by the acceleration sensor. Consequently, the size of the observed image can be set in accordance with the true forward/backward movement distance of the display device 2a or video camera 5.

Figure 10:
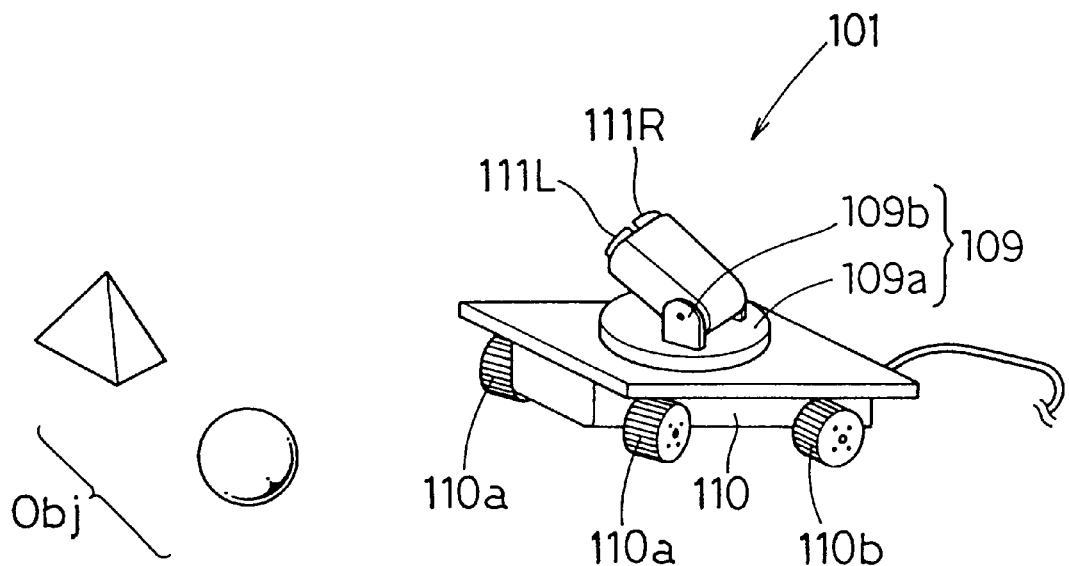
FIG. 10 is an external view showing an outlined constitution of an image display apparatus of a third embodiment of the present invention.
Figure 10:
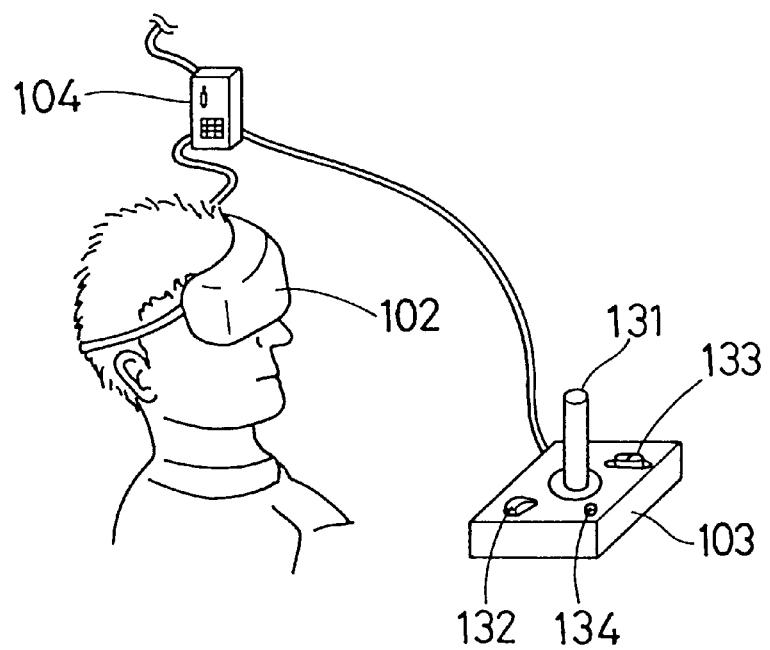

FIG. 10 is an external view of a third embodiment of the present invention. The image display apparatus comprises a mobile stereoscopic camera 101, an HMD 102, an operation board 103, and a control box 104.

The stereoscopic camera 101 is equipped with a vehicle 110 having wheels 110a and 110b, a direction setting device 109 disposed on the top surface of the vehicle 110, and right and left cameras 111R and 111L supported by the direction setting device 109. By shooting an object Obj with the right and left camera 111R and 111L, right and left images with parallax are generated. The right and left cameras 111R and 111L each is equipped with a zoom lens serving as a taking lens, and is so configured that the size of the shooting area is changed by adjusting the focal length of the zoom lens.

The wheels 110a and 110b are driven by motors disposed inside the vehicle 110. The front wheels 110a can change their direction rightward and leftward, so that the stereoscopic camera 101 can not only move forward and backward but also turn rightward and leftward. Movement of the stereoscopic camera 101 is controlled by use of the later described operation board 103.

The direction setting device 109 comprises a rotation plate 109a that rotates on the top surface of the vehicle 110, and right and left arms 109b vertically fitted onto the rotation plate 109a. The right and left cameras 111R and 111L are fitted onto the arms 109b to be vertically rotatable. Owing to the vertical rotation of the right and left cameras 111R and 111L and the horizontal rotation of the rotation plate 109a, the stereoscopic camera 101 can shoot in any direction. These components receive their rotation driving force from motors which not shown in FIG. 10. The direction of the right and left cameras 111R and 111L is, as described later, interlocked with the direction of the head of the observer wearing the HMD 102.

The HMD 102 provides the observer with a stereoscopic image of the object Obj by presenting the right and left images taken by the stereoscopic camera 101 before the eyes of the observer wearing the HMD 102. The operation board 103 is equipped with an operation lever 131, two operation dials 132 and 133, and a switch 134, all of which are operated by the observer. The control box 104 is connected to the stereoscopic camera 101, the HMD 102, and the operation board 103 so as to control the stereoscopic camera 101 based on signals received from the HMD 102 and the operation board 103. The control box 104 also transmits video signals from the stereoscopic camera 101 to the HMD 102, and generates video signals representing the appearance of the stereoscopic camera 101 to feed them to the HMD 102 so that the appearance of the stereoscopic camera 101 is superimposed on the object image.

Figure 11:
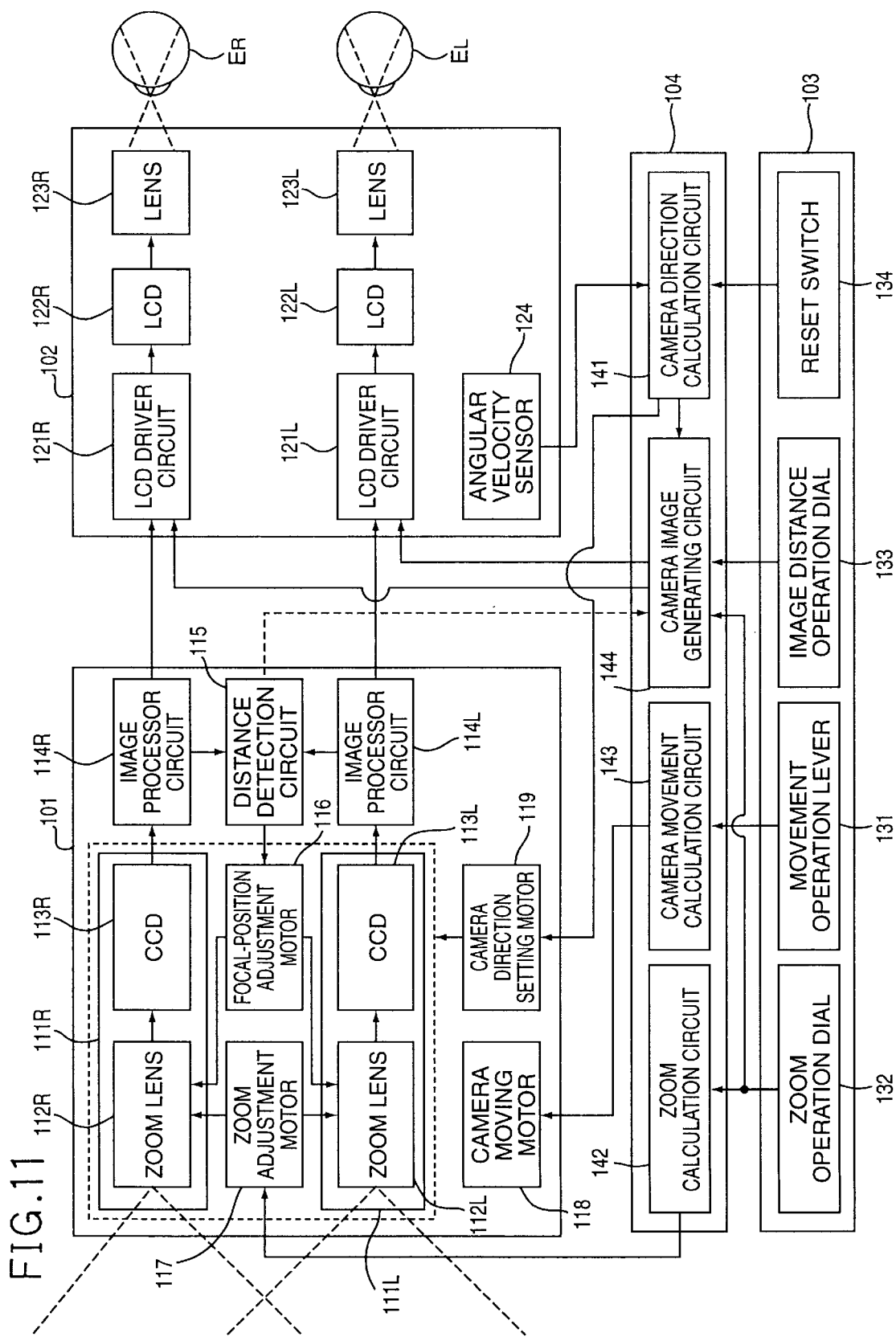
FIG. 11 is a block diagram showing the constitution and signal flows of the image display apparatus of the third embodiment of the present invention.

FIG. 11 shows the constitution of each unit and signal flows. The right and left cameras 111R and 111L of the stereoscopic camera 101 have CCDs 113R and 113L, respectively, serving as image pickup devices, so that shooting is effected by receiving on the CCDs 113R and 113L the light incoming from the object through the zoom lenses 112R and 112L. The stereoscopic camera 101 is further provided with right and left image processor circuits 114R and 114L, a distance detection circuit 115, a focal-position adjustment motor 116 for adjusting the focal position of the zoom lenses 112R and 112L, a zoom adjustment motor 117 for adjusting the focal length of the zoom lenses 112R and 112L, camera moving motors 118 for driving the wheels 110a and 110b, and camera direction setting motors 119 for supplying a driving force to the direction setting device 109. As the camera moving motors 118, two motors are provided: one for forward and backward movement, and the other for changing the direction of the front wheels. As the camera direction setting motors 119, two motors are provided: one for vertical rotation, and the other for horizontal rotation.

The CCDs 113R and 113L convert the received light into electric signals, and supplies the signals to the right and left image processor circuits 114R and 114L. The right and left image processor circuits 114R and 114L convert the signals from the CCDs 113R and 113L into video signals to be delivered to the HMD 102, and, meanwhile, supplies signals representing a predetermined portion of CCDs 113R and 113L to the distance detection circuit 115. The distance detection circuit 115, based on the thus given right and left signals, detects the positions of the right and left images of the object, and then, based on the positional deviation between the right and left images, detects the deviation of the focal position and the distance to the object. Based on the detected focal-position deviation, the distance detection circuit 115 drives the focal-position adjustment motor 116 to adjust the focal positions of the zoom lenses 112R and 112L, so that the light from the object forms images on the photoreceptive surfaces of the CCDs 113R and 113L.

The zoom adjustment motor 117 is driven based on a control signal from the control box 104 to adjust the focal lengths of the zoom lenses 112R and 112L. The camera moving motors 118 are driven based on control signals from the control box 104 to rotate the wheels 110a and 110b so as to make the stereoscopic camera 101 move forward or backward, or turn rightward or leftward. The camera direction setting motors 119 are driven based on control signals from the control box 104 to rotate the right and left cameras 111R and 111L vertically and the rotation plate 109a horizontally.

The HMD 102 comprises right and left LCDs 122R and 122L, right and left LCD driver circuits 121R and 121L for driving the LCDs, right and left eyepieces 123R and 123L, and an angular velocity sensor 124. The right and left video signals from the image processor circuits 114R and 114L of the stereoscopic camera 101 are fed to the right and left LCD driver circuits 121R and 121L, respectively. Also fed to the LCD driver circuits 121R and 121L are the right and left video signals representing the appearance of the stereoscopic camera 101 that are generated by the control box 104. The LCD driver circuits 121R and 121L superimpose the camera appearance images carried on the signals from the control box 104 onto the images carried on the signals from the stereoscopic camera 101, and display the resultant images on the right and left LCDs 122R and 122L, respectively.

Figure 12:
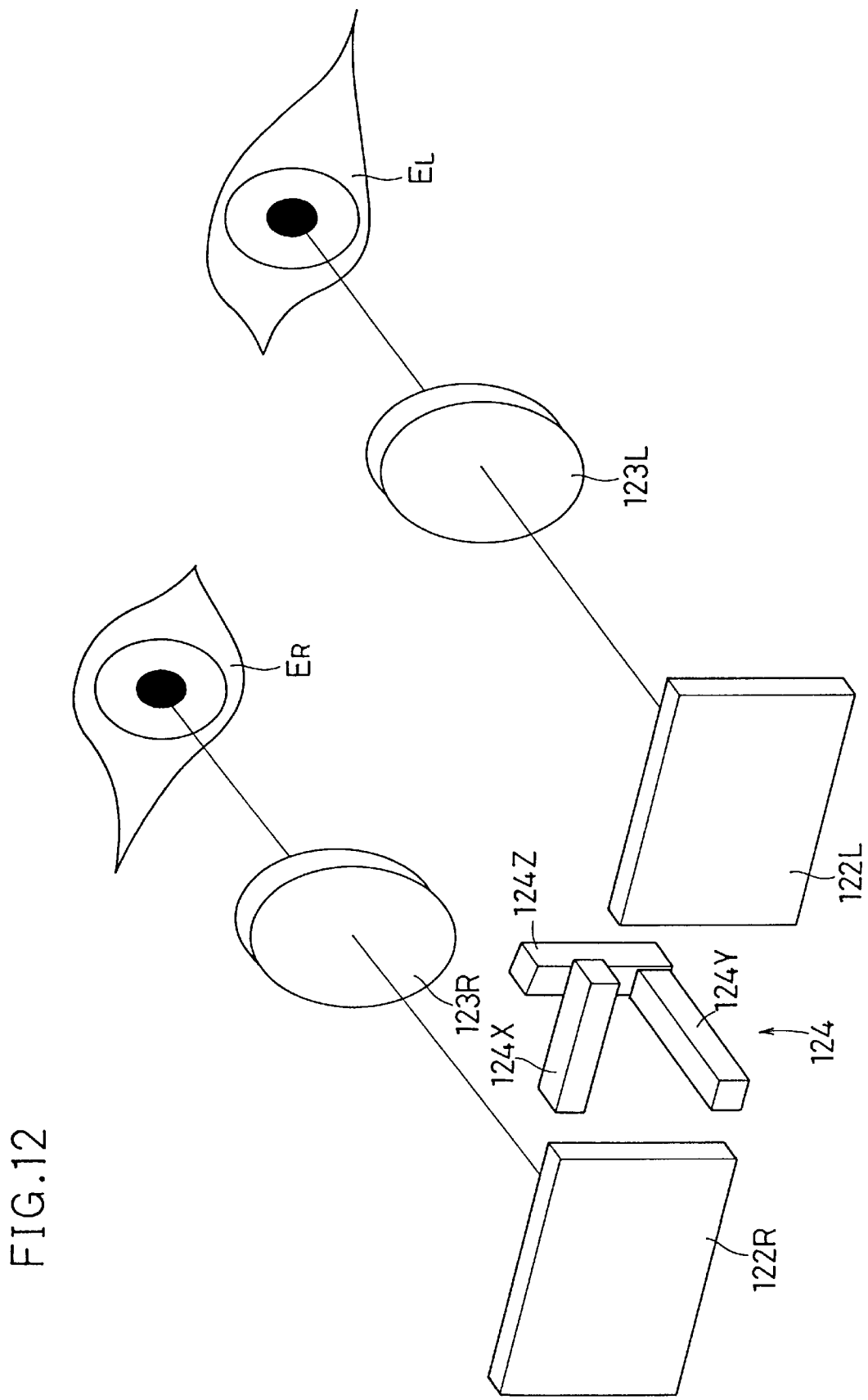
FIG. 12 is a diagram showing the constitution of the HMD of the image display apparatus of the third embodiment of the present invention.

FIG. 12 is a schematic diagram showing the internal constitution of the HMD 102. The eyepieces 123R and 123L direct the image light of the LCDs 122R and 122L to the right and left eyes EL and ER of the observer. The eyepieces 123R and 123L have a fixed focal length, which is set to a value that makes the images on the LCDs 122R and 122L appear enlarged. By observing images through the eyepieces 123R and 123L, the observer observes the virtual images of the images displayed on the LCD 122R and 122L.

As the angular velocity sensor 124, piezoelectric vibration gyros are used. A piezoelectric vibration gyro, which is formed in a column-like shape, detects angular velocity of rotation in a direction perpendicular to its axis, and outputs a voltage of a magnitude corresponding to the detected angular velocity. In this embodiment, three piezoelectric vibration gyros 124X, 124Y and 124Z are arranged perpendicularly to one another as shown in the figure. With these three piezoelectric vibration gyros, any rotational movement of the observer's head can be detected.

The gyro 124X detects angular velocity of the rotation caused when the observer wearing the HMD 102 tilts his/her head upward or downward (hereinafter referred to as vertical rotation). The gyro 124X outputs a positive voltage when it detects upward rotation, and a negative voltage when it detects downward rotation. The gyro 124Z detects angular velocity of the rotation caused when the observer rotates his/her head rightward or leftward (hereinafter referred to as horizontal rotation). The gyro 124Z outputs a positive voltage when it detects rightward rotation, and a negative voltage when it detects leftward rotation. The gyro 124Y detects angular velocity of the rotation caused when the observer tilts his/her head rightward or leftward. The gyro 124Y outputs a positive voltage when it detects a rightward tilt, and a negative voltage when it detects a leftward tilt. The direction of rotation is known from the sign of the output voltage of these piezoelectric vibration gyros 124X, 124Y and 124Z; the velocity of rotation is known from the magnitude of those voltages.

As shown in FIG. 11, the control box 104 incorporates a camera direction calculation circuit 141, a zoom calculation circuit 142, a camera movement calculation circuit 143, and a camera image generating circuit 144. The camera direction calculation circuit 141, fed with the output voltage of the angular velocity sensor 124, calculates the rotation angle of the head of the observer wearing the HMD 102 with respect to reference directions for the horizontal and vertical rotations. In this embodiment, the reference directions are the directions of the observer's head when he/she is looking straight ahead. For example, when the observer looks down leftward, all the three piezoelectric vibration gyros 124X, 124Y and 124Z output a voltage, and the camera direction calculation circuit 141, correcting the outputs of the gyros 124Z and 124X based on the output of the gyro 124Y, calculates true horizontal and vertical rotation angles.

The camera direction calculation circuit 141 provides the camera direction setting motors 119 with control signals, so that the right and left cameras rotate horizontally and vertically through the calculated angles. The camera direction calculation circuit 141 also provides the camera image generating circuit 144 with signals representing the calculated angles.

The zoom calculation circuit 142 determines the size of the shooting area based on a signal from the operation dial 132 of the operation board 103 in order to calculate, in accordance with that shooting area, the focal lengths to which the zoom lenses 112R and 112L should be set, and then supplies a control signal to the zoom adjustment motor 117 of the stereoscopic camera 101. The camera movement calculation circuit 143, receiving a signal from the operation lever 131 of the operation board 3, generates control signals for moving the stereoscopic camera 101 forward or backward, or turning its movement direction. These control signals are fed to the camera moving motors 118.

The operation lever 131 of the operation board 103 is used to control the motion of the stereoscopic camera 101, and is constructed to be inclinable forward, backward, rightward, leftward, and to any oblique direction. The stereoscopic camera 101 moves forward when the movement operation lever 131 is inclined forward, and moves backward when the lever 131 is inclined backward. The camera movement calculation circuit 143 drives the camera movement motor 118 in such a way that the speed of forward/backward movement of the stereoscopic camera 101 corresponds to the angle of the forward/backward inclination of the movement operation lever 131. When the movement operation lever 131 is in a neutral position, the stereoscopic camera 101 stands still. When the movement operation lever 131 is inclined rightward or leftward, the front wheels 110*a* of the stereoscopic camera 101 turns their direction rightward or leftward. The camera movement calculation circuit 143 drives the camera movement motor 118 in such way that the rightward/leftward orientation of the front wheels 110*a* corresponds to the angle of rightward/leftward inclination of the movement operation lever 131.

The operation dial 132 is used to change the size of the shooting area. As described above, the output of the zoom operation dial 132 is fed to the zoom calculation circuit 142. By rotating the zoom operation dial 132, the observer can manually set the shooting area to a desired size. The output of the zoom operation dial 132 is also fed to the camera image generating circuit 144.

The switch 134 is used to give initialization instructions to the camera direction calculation circuit 141. The observer wearing the HMD 102 operates the reset switch 132 while looking straight ahead. When the reset switch 134 is operated, the camera direction calculation circuit 141 resets the horizontal and vertical rotation angles to zero, thus using the angles of the head at this time point as reference directions for calculating angles. When the reset switch 134 is operated, the camera direction calculation circuit 141 provides the camera direction setting motors 119 with control signals so that the right and left cameras 111R and 111L are levelly oriented to the straight forward direction of the stereoscopic camera 101. This reset operation serves for removing errors accumulated in the output of the angular velocity sensor 124 that uses piezoelectric vibration gyros, and enables the direction of the observer's head and the shooting direction of the stereoscopic camera 101 to coincide with each other at any time.

The camera image generating circuit 144 in the control box 104 generates the right and left images of the appearance of the stereoscopic camera 101 that are superimposed on the object images displayed on the LCDs 122R and 122L. The camera image generating circuit 144, in which the size and the outline of the stereoscopic camera 101 are stored, is capable of generating a camera appearance image at any view angle and in any size. In this embodiment, however, it generates appearance images of the stereoscopic camera 101 as viewed from the back.

How distant the camera appearance images appear, when they are displayed on the LCDs 122R and 122L, depends on the distance and parallax between the right and left appearance images. In this embodiment, the distance and parallax between the right and left appearance images are initially set to values with which the camera appearance images appear in a position 1 m ahead of the stereoscopic camera 101. These values are not fixed, but can be changed by the observer.

The distance to the camera appearance images can be changed by operating the operation dial 133 of the operation board 103. The camera image generating circuit 144, on receiving a signal from the image distance operation dial 133, either increases or decreases the distance and parallax between the right and left appearance images in order to change the distance to the camera appearance images. In this process, the size of the camera appearance images is changed in accordance with the distance. The distance to the camera appearance images can be set to any value between 30 cm to 10 m.

The size of the camera appearance images is set in accordance with the focal length of the right and left zoom lenses 112R and 112L, that is, the size of the shooting area. When the focal length is changed through operation of the zoom operation dial 132, the object is shot with reduction or enlargement. Meanwhile the camera image generating circuit 144, based on the signal received from the zoom operation dial 132, enlarges or reduces the size of the camera appearance images by the same factor as the object image.

The position of the camera appearance images is set in such a way that they always appear straight ahead of the stereoscopic camera 101, irrespective of the specified direction of the right and left cameras 111R and 111L. Specifically, when the right and left cameras 111R and 111L point straight in the forward direction as the result of initialization through the above described reset operation, the right and left appearance images are at first displayed substantially at the centers of the LCDs 122R and 122L, respectively. Thereafter, the position of the right and left appearance images is changed in accordance with the rotation angles received from the camera direction calculation circuit 141. For example, when the observer wearing the HMD 102 rotates his/her head 30° rightward and inclines it 20° upward, the camera appearance images are moved in the direction and to the degree corresponding to a rotation 30° leftward and 20° downward.

Figure 13A:
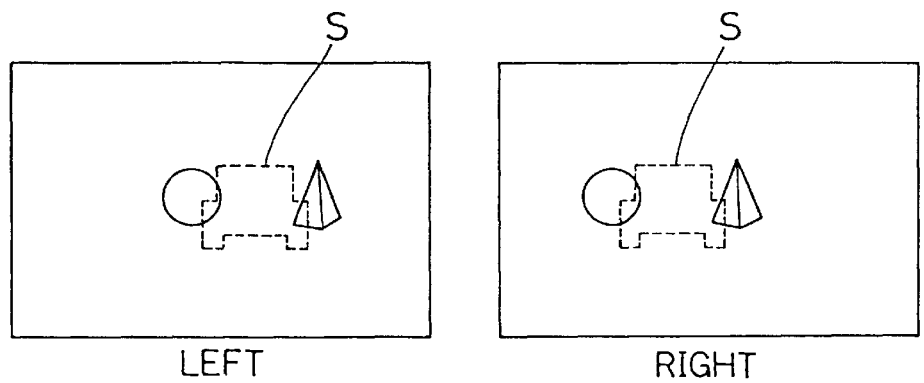
FIGS. 13A to 13D show examples of images displayed in the image display apparatus of the third embodiment of the present invention.

The signals of the appearance images of the stereoscopic camera 101 thus generated are superimposed on the signals of the object images by the LCD driver circuits 121R and 121L in the HMD 102, and the superimposed images are displayed on the LCDs 122R and 122L. FIGS. 13A to 13D show examples of display on the LCDs 122R and 122L. In the figures, solid lines within a frame indicate object images; broken lines indicate appearance images of the stereoscopic camera 101. FIG. 13A shows images obtained when the right and left cameras 111R and 111L are oriented straight in the forward direction with a medium focal length of the zoom lenses 112R and 112L. The camera appearance images S are set to appear 1 m ahead; the objects are situated at a distance over 1 m from the stereoscopic camera 101.

Figure 13B:
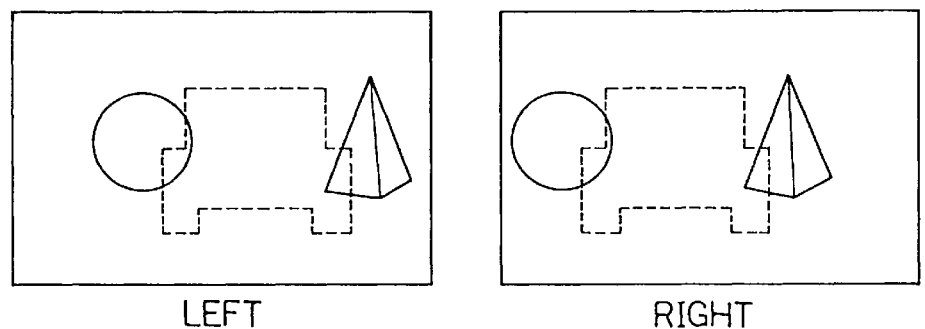

In comparison with FIG. 13A, FIG. 13B shows images obtained with a longer focal length of the zoom lenses 112R and 112L. With the shooting area reduced, individual objects appear larger. The appearance images of the stereoscopic camera 101 also appear larger, in accordance with the enlargement factor for objects. Since the object images and the camera appearance images change at the same rate, the observer can correctly recognize the relative sizes of the object and the stereoscopic camera 101 irrespective of the size of the shooting area.

Figure 13C:
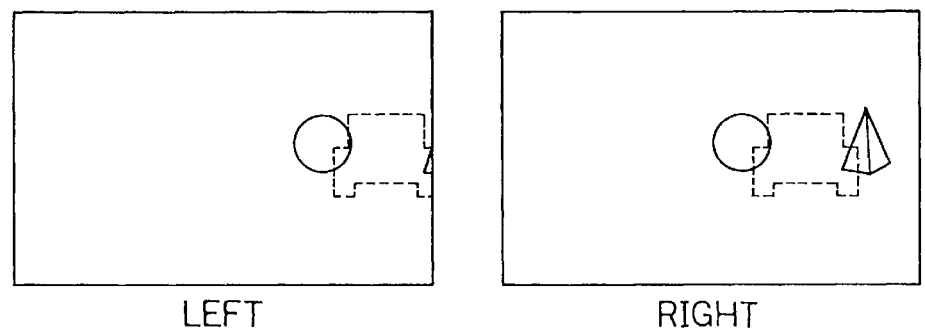

In comparison with FIG. 13A, FIG. 13C shows images obtained when the observer rotates his/her head 20° leftward without changing the movement direction of the stereoscopic camera 101. The right and left cameras 111R and 111L accordingly rotate 20° leftward, and the object images move rightward. The camera appearance images move rightward together with the object images as well. Since the camera appearance images are displayed on the right, the observer knows that the stereoscopic camera 101 is headed forward-rightward.

Figure 13D:
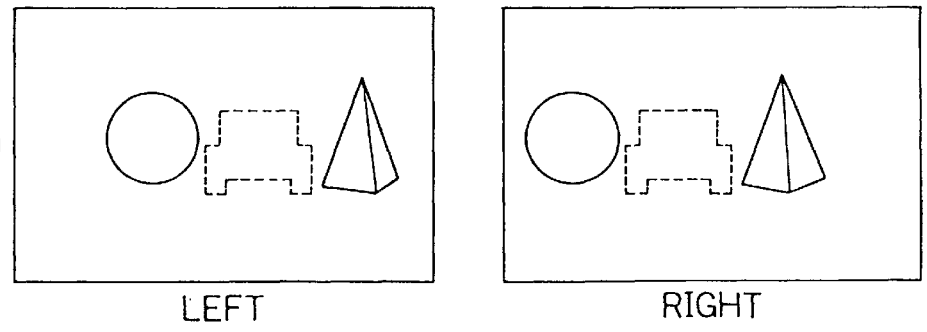

In comparison with FIG. 13A, FIG. 13D shows images obtained when the stereoscopic camera 101 has moved forward to a position as close as 1 m to the objects. With the distance shorter, the objects appear larger. In contrast, the camera appearance images remain as large as in FIG. 13A. Under this state, the parallax of the object images and that of the camera appearance images are the same, giving the observer a sense of distance that the distance from the stereoscopic camera 101 to the objects is about 1 m. In this case, since the width of the camera appearance images is smaller than the distance between the right and left objects, the stereoscopic camera 101 can be driven forward between the objects without colliding with the objects. If the distance between the right and left objects is smaller than the width of the camera appearance image, the observer, judging that it is impossible to pass through, can make the stereoscopic camera 101 take a detour.

As described above, in the image display apparatus according to the present invention, since the relative sizes of the object and the camera are recognized clearly, the camera can be moved with simpler operation.

It is to be noted that the distance to the camera appearance images should be adjusted to the purposes and conditions of particular applications, with size of the mobile camera, movement speed, type of shooting objects and others taken into consideration. In order to achieve efficient movement operation without collision, the distance to the camera appearance images had better be longer when the movement speed is high or the object is distant, whereas the distance had better be shorter when the movement speed is low or the object is near.

Although the distance to the appearance images of the mobile camera is set by the observer in the above embodiment, the distance to the camera appearance images may be kept identical with the distance to the object at all time. In that case, as shown with an broken-line arrow in FIG. 11, the distance to the object detected by the distance detection circuit 115 of the stereoscopic camera 101 is fed to the camera image generating circuit 144. The camera image generating circuit 144 determines the distance and parallax between the right and left images of the camera appearance in accordance with the given distance. In this constitution, the observer can correctly recognize the relative sizes of the object and the mobile camera at any time irrespective of the distance to the object. This helps the operator judge even from a distance whether to make a detour or not.

Obviously, many modifications and variations of the present invention are possible in light of the above teachings. It is therefore to be understood that within the scope of the appended claims, the invention may be practiced other than as specifically described.

What is claimed is:

1. An image display apparatus comprising:

a display means for displaying an image;

a detection means for detecting a forward and backward movement of an image observer's head, said detection means including an acceleration detection means for detecting acceleration resulting from the forward and backward movement of said image observer's head and a tilt detection means for detecting forward and backward tilt of said image observer'head; and a control means for changing display magnification of the image displayed on the display means in accordance with the movement of the image observer's head detected by the detection means, and for calculating a horizontal acceleration component included in the movement of said image observer's head by correcting a detection result of the acceleration detection means based on a tilt detected by the tilt detection means.

2. An image display apparatus as claimed in claim 1, wherein said control means calculates a relative position of the image observer's head with respect to an initial position thereof based on a detection result of said detection means, and changes the display magnification of the image displayed on said display means in accordance with said relative position.

3. An image display apparatus as claimed in claim 2, wherein said control means keeps increasing said display magnification while said relative position of the image observer's head with respect to the initial position thereof is in front of a predetermined reference range, keeps decreasing said display magnification while said relative position is behind said reference range, and keeps said display magnification constant while said relative position is within said reference range.

4. An image display apparatus as claimed in claim 3, further comprising:

a magnification instruction means with which the image observer manually instructs a change in the display magnification of the image displayed on said display means, wherein, on receiving an instruction for a change in said display magnification from the magnification instruction means, said control means changes said display magnification in accordance with the instruction from the magnification instruction means irrespective of said relative position of the image observer's head with respect to the initial position thereof.

5. An image display apparatus as claimed in claim 2, wherein said control means changes said display magnification, making a magnification corresponds one to one to a distance of movement of said image observer's head with respect to the initial position thereof.

6. An image display apparatus as claimed in claim 5, further comprising:

a magnification instruction means with which the image observer manually instructs a change in the display magnification of the image displayed on said display means, wherein, on receiving an instruction for a change in said display magnification from the magnification instruction means, said control means further changes said display magnification in accordance with the instruction from the magnification instruction means, starting with a magnification at the time of issuance of the instruction.

7. An image display apparatus as claimed in claim 1, further comprising:

an shooting apparatus for shooting an image to be displayed on said display means, provided with a zoom lens capable of changing a size of shooting area by changing focal length thereof.

8. An image display apparatus as claimed in claim 7, wherein said control means changes the display magnification of the image displayed on said display means by changing the focal length of the zoom lens of said shooting apparatus.

9. An image display apparatus as claimed in claim 1, wherein said display means is a head-mounted display, which is worn by the image observer on his/her head.

10. An image display apparatus as claimed in claim 9, wherein said display means is provided with a display device and an eyepiece comprising a zoom lens disposed between said display device and an eye of the image observer, and wherein said control means changes the display magnification of the image displayed on said display means by changing focal length of the eyepiece of said display means.

11. An image display apparatus as claimed in claim 9, wherein said detection means is formed to be integral with said head-mounted display.

12. An image display apparatus comprising:

a display means for displaying an image;

detection means for detecting movement of an image observer's head, the detection means including an acceleration detection means for detecting acceleration resulting from the forward and backward movement of said image observer's head, a tilt detection means for detecting forward and backward tilt of the image observer's head, and calculation means for calculating a movement distance of the image observer's head based on the acceleration detected by said acceleration detection means and the tilt detected by said tilt detection means; and control means for changing a display of said image based on the movement of the image observer's head detected by said detection means.

13. An image display apparatus as claimed in claim 12, wherein the calculation means calculates the horizontal acceleration component by correcting the detected acceleration based on the detected tilt.

14. An image display apparatus as claimed in claim 12, wherein the control means changes a magnification of the display based on the calculated movement distance.

* * * * *